Figure 2:
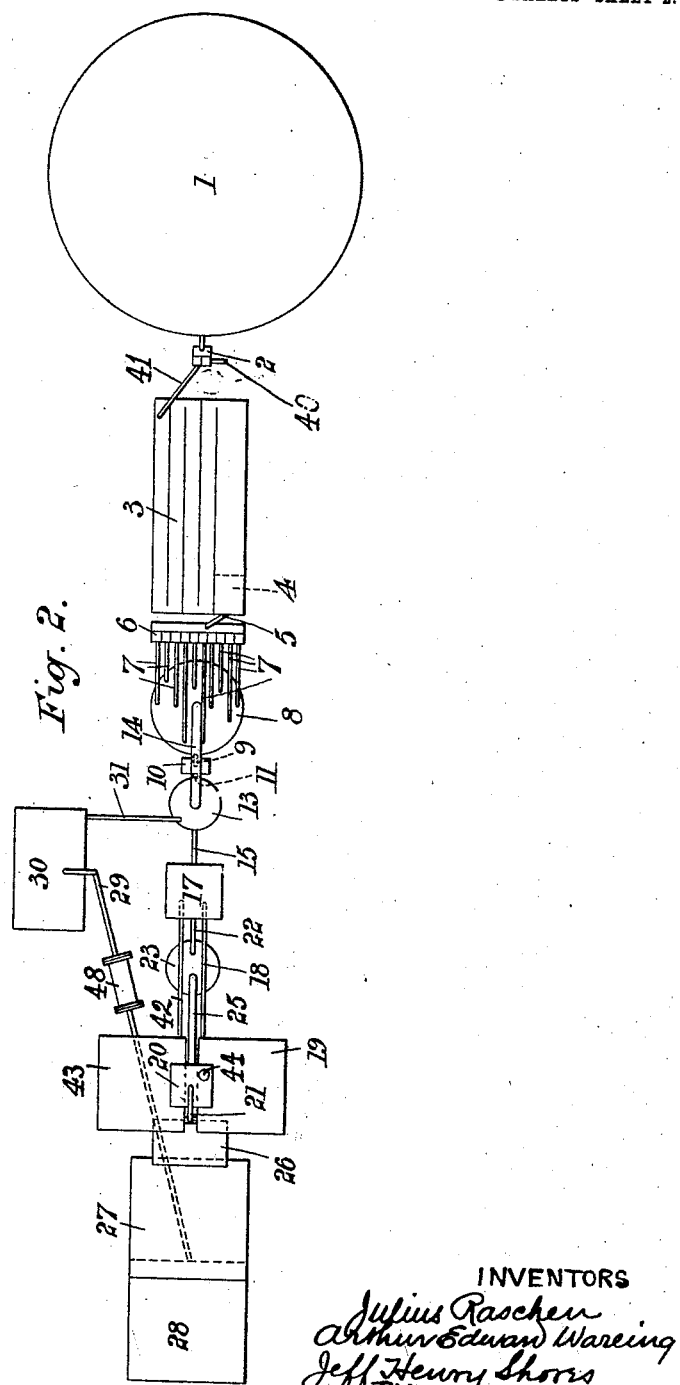

No. 863,940. PATENTED AUG. 20, 1907.
J. RASCHEN, A. E. WAREING & J. H. SHORES.
PURIFICATION OF ARSENICAL SULFURIC ACID.
APPLICATION FILED MAR. 21, 1906.

2 SHEETS—SHEET 1.

Fig. 1.

WITNESSES
M. E. Keir
L. H. Grote

INVENTORS
Julius Raschen
Arthur Edward Wareing
Jeff Henry Shores
BY
Howson and Howson
ATTORNEYS No. 863,940. PATENTED AUG. 20, 1907.
J. RASCHEN, A. E. WAREING & J. H. SHORES.
PURIFICATION OF ARSENICAL SULFURIC ACID.
APPLICATION FILED MAR. 21, 1906.

2 SHEETS—SHEET 2.

WITNESSES
M. E. Keir
L. H. Grote

INVENTORS
Julius Raschen
Arthur Edward Wareing
Jeff Henry Shores
BY
Howson and Howson
ATTORNEYS

UNITED STATES PATENT OFFICE.

JULIUS RASCHEN, ARTHUR EDWARD WAREING, AND JEFF HENRY SHORES, OF LIVERPOOL, ENGLAND, ASSIGNORS TO THE UNITED ALKALI COMPANY LIMITED, OF LIVERPOOL, ENGLAND.

PURIFICATION OF ARSENICAL SULFURIC ACID.

No. 863,940. Specification of Letters Patent. Patented Aug. 20, 1907.

Application filed March 21, 1906. Serial No. 307,179.

*To all whom it may concern:*

Be it known that we, JULIUS RASCHEN, a subject of the King of Great Britain and Ireland, Ph. D., analytical chemist, ARTHUR EDWARD WAREING, a subject of the King of Great Britain and Ireland, chemist, and JEFF HENRY SHORES, a subject of the King of Great Britain and Ireland, M. Sc., Ph. D., analytical chemist, all residing at 30 James street, Liverpool, in the county of Lancaster, England, have invented new and useful Improvements in the Purification of Arsenical Sulfuric Acid and the Obtainment of Arsenic Therefrom, of which the following is a specification.

The object of this invention is to provide an efficient and economical process, by which arsenical sulfuric acid can be purified and obtained in a practically pure condition and by which white arsenic is obtained therefrom which is also practically pure without distillation being necessary.

This invention is especially intended for the treatment of arsenical sulfuric acid obtained by burning arsenical sulfur ores, and particularly arsenical pyrites, the gaseous products being passed in the usual, or any suitable manner into a tower, such as a Glover tower, through which the sulfuric acid flows with the arsenic dissolved in it, but the invention is applicable to the treatment of arsenical sulfuric acid from whatever source obtained.

We will describe with reference to the accompanying diagrams, the way in which the invention may be practically carried out and apparatus adapted for carrying it out, Figure 1 being a diagrammatic elevation and Fig. 2 a diagrammatical plan of such apparatus.

According to this invention the arsenical sulfuric acid, as it flows from the Glover tower is (preferably after first being brought into contact, with a reducing agent, such as charcoal, whereby the arsenic compounds are reduced to the arsenious state), brought, in any suitable de-arsenicating tower, or vessel and at a temperature lower than the boiling point of arsenious chlorid into contact with hydrochloric acid gas (preferably dry). A suitable temperature is between 90° and 100° centigrade. If the temperature were appreciably below 90° centigrade an emulsion would be formed from which it would be difficult to separate the arsenious chlorid and if the temperature were much above 100° centigrade the arsenious chlorid formed would be volatilized. By the aforesaid operation arsenious chlorid is formed, and nearly the whole of this will separate as an oily liquid when the sulfuric acid, containing it, is run into a suitable vessel, or vessels. The sulfuric acid which is in the vessel, or vessels, in which the arsenious chlorid deposits as an oily liquid, as aforesaid, is preferably drawn off and subjected to the action of air which removes practically the whole of the remaining arsenious chlorid not previously separated as oily arsenious chlorid, the said sulfuric acid passing away in a purified condition, the arsenious chlorid thus blown from the sulfuric acid passing into a scrubbing tower down which water is caused to flow (and which can be made to circulate if desired) so that decomposition takes place between the arsenious chlorid and water with the formation of arsenious oxid and hydrochloric acid, which arsenious oxid is however contaminated with traces of selenium. To this mixture sufficient arsenious chlorid, which had previously separated as an oily liquid from the sulfuric acid, is added to redissolve the whole of the precipitated arsenious oxid, when, on the addition of a little water, it will be found that the selenium is precipitated. The whole mixture is then filtered so as to separate the selenium and water is added to the clear liquid, to make the density of the solution equal to about 28° Twaddle, when a considerable quantity (say seventy per cent.) of the arsenic is precipitated as arsenious oxid, and the whole is then filtered and washed, and the arsenious oxid is retained on the filter, while the hydrochloric acid solution, (retaining the unprecipitated arsenic), is returned to a vessel from which it is fed, to the vessel, or to one of the vessels, in which, as aforesaid, the sulfuric acid lies above the liquid arsenious chlorid, or into a vessel containing sulfuric acid from any other source, and the hydrochloric acid gas, which is liberated by contact with this sulfuric acid, is conducted to the tower, or de-arsenicating vessel, in which arsenious chlorid is being formed from arsenical sulfuric acid as aforesaid, and thus the hydrochloric acid is circulated and re-used in the process, and, in addition, that arsenic which was dissolved in the hydrochloric acid is returned to the process to be recovered as already described.

Any liquid arsenious chlorid, over and above that which is required to redissolve the arsenious oxid precipitated in the scrubbing tower, is freed from selenium by filtration after the addition of the requisite amount of water to retain the arsenic in solution and precipitate the selenium, and is then treated with a further quantity of water for the separation of arsenious oxid as before described. A connection is made between the de-arsenicating tower and scrubbing tower to enable inert gases to escape from the de-arsenicating tower.

1 represents a Glover tower from which the arsenical sulfuric acid passes into a box 2, which is preferably arranged so that only an amount of acid corresponding to the amount made runs off for treatment according to this invention, for which purpose the box 2 may have two outlets, one, 40, approximately double the size of the other 41, the smaller one being the outlet for arsenical sulfuric acid to be treated according to this invention, and the larger one being the outlet for the acid to be returned for circulating purposes to the Gay Lussac tower in the ordinary way. From the box 2, the arsenical sulfuric acid passes into a vessel 3, containing charcoal, by which the arsenic compounds in the sulfuric acid are reduced to the arsenious state, and the sulfuric acid containing the whole, or practically the whole of the arsenic in the arsenious state, passes, by the pipe 5, from the space 4, into the distributer 6, and thence by the distributing pipes 7, (bent so as to form liquid seals against the passage of gas), into the packed de-arsenicating tower 8 through which it passes, preferably in the same direction as the hydrochloric acid gas entering by the pipe 14. The temperature in the tower 8 is below the boiling point of arsenious chlorid and is preferably between 90° and 100° centigrade and, if necessary, the acid can be cooled to such temperature before it passes into the said tower. The sulfuric acid now containing the arsenic in the form of arsenious chlorid, passes, by the pipe 9, into the vessel 10, thence into the vessel 13, and thence into the vessel 17, which vessels communicate with each other by pipes as shown, the upper pipes 11 and 15 being for the passage of the sulfuric acid and the lower pipes 12 and 16 being for the passage of the liquid arsenious chlorid which separates and deposits, as an oily liquid as aforesaid, beneath the sulfuric acid. The object of thus arranging the said vessels and communications is to insure separation of the arsenious chlorid from the sulfuric acid and thus prevent the hydrochloric acid gas, which is evolved in the vessel 13, as hereinafter described, from carrying away any of the liquid arsenious chlorid with it back to the tower 8.

From the lower part of the separating vessel 17 the arsenious chlorid passes, by the pipe 18, or the pipe 42, into the vessel 19, or the vessel 43, each communicating with a scrubbing tower 20, provided with an air escape pipe 44 and packed with suitable material, such as inverted V tiles of glazed earthenware, down which water is passed, the said water being circulated (by a pump, for example, as indicated at 45), through the pipe 21, until the solution is of a density of, or about 20° Twaddle.

The sulfuric acid passing off from the upper part of the separating vessel 17, by the pipe 22, still contains a small amount of arsenious chlorid in solution and to recover this and complete the purification of the said acid, the said acid is passed into a blowing vessel 23, which contains devices by which the said acid is spread over a large surface and air is caused to pass in contact therewith. Such devices may consist of perforated plates with baffle plates above to prevent sulfuric acid from being mechanically carried forward. Air is blown in, by any suitable means (such as a pump indicated at 46) at the lower part of the vessel 23 by the pipe 24, the said air passing through the perforations in the trays and carrying off with it the remaining arsenious chlorid which passes into the tower 20, by the pipe 25, where it is treated with water as hereinbefore described, the air escaping by the pipe 44. The purified sulfuric acid passes away for use, by the pipe 47 which is brought up to a level necessary to retain the required depth of liquid in the vessel 23. The solution flowing from the tower 20 consists of hydrochloric acid containing dissolved and suspended arsenious oxid. This mixture flows into one, or other, of the vessels 19, 43 in which it is treated with liquid arsenious chlorid from the vessel 17, in order to redissolve the arsenious oxid which has been precipitated in the scrubbing tower 20, the two vessels 19, 43 being used alternately (the communicating pipes being arranged and provided with valves so as to enable the communications to be reversed) one such vessel being used for circulating purposes while the contents of the other vessel are being treated for the precipitation of selenium. On the addition of a little water (approximately three volumes water to one volume arsenious chlorid) separation of selenium takes place and this selenium is removed by filtration through a filter in the box 26, the clear liquor running into the vessel 27. To this clear liquor is added such a quantity of water that a liquor of a density of about 28° Twaddle is obtained whereby about 70 per cent. of the arsenic is precipitated as arsenious oxid. The mixture is then passed from the vessel 27, onto the filtering medium in the vessel 28, and the arsenious oxid is retained by and washed on this filter and is obtained in a purified state not requiring sublimation. The hydrochloric acid solution, still retaining the rest of the arsenic (about 30 per cent) is returned through the pipe 29, to the tank 30 (which may be done by a pump 48) from which it is passed by the pipe 31, to the vessel 13, so that, by contact with the sulfuric acid above the arsenious chlorid therein, the said hydrochloric acid gas is liberated and passes, by the pipe 14, into the tower 8, for re-use in the process described.
If desired the arsenical sulfuric acid can be run direct into the tower 8 instead of first passing through the charcoal, or other reducing agent.

We claim as our invention

1. The process of purifying arsenical sulfuric acid and obtaining arsenic therefrom in the condition of liquid arsenious chlorid, consisting in bringing arsenical sulfuric acid into contact with hydrochloric acid gas at a temperature from 90° C. to 130° C., substantially as described.

2. The process of purifying arsenical sulfuric acid and obtaining arsenic therefrom in the condition of liquid arsenious chlorid, consisting in reducing the arsenic compounds in the arsenical sulfuric acid to the arsenious state and then bringing the acid into contact with hydrochloric acid gas in a manner substantially as described at a temperature from 90° C. to 130° C.

3. The process of purifying arsenical sulfuric acid and obtaining arsenic therefrom, consisting in treating the arsenical sulfuric acid at a temperature from 90° C. to a point just below the boiling point of arsenious chlorid with hydrochloric acid gas in a manner substantially as described and then treating the liquid arsenious chlorid so produced with a limited quantity of water, and filtering the solution so as to separate selenium and adding to the solution filtered off a further quantity of water and filtering so as to separate arsenious oxid.

4. The process of purifying arsenical sulfuric acid and obtaining arsenic therefrom, consisting in reducing the arsenic compounds in the arsenical sulfuric acid to the arsenious state and then treating the acid, at a temperature from 90° C. to a point just below the boiling point of arsenious chlorid, with hydrochloric acid gas in a manner substantially as described and treating the liquid arsenious chlorid so produced with a limited quantity of water, and filtering the solution so as to separate selenium and adding to the solution filtered off a further quantity of water, and filtering so as to separate arsenious oxid.

5. The process of purifying arsenical sulfuric acid and obtaining arsenic therefrom consisting in treating the arsenical sulfuric acid at a temperature from 90° C. to a point just below the boiling point of arsenious chlorid with hydrochloric acid gas in a manner substantially as described, and allowing the liquid arsenious chlorid formed to separate from the sulfuric acid, and treating the liquid arsenious chlorid with a limited quantity of water, and separating the remaining arsenic present in the arsenious state by treating the sulfuric acid with air and passing the gases into a water scrubber and adding to the arsenious oxid so separated liquid arsenious chlorid, the solution thus formed being treated with a limited quantity of water, then filtering the solution to separate selenium and adding to the solution filtered off, a further quantity of water, and filtering so as to separate arsenious oxid.

6. The process of purifying arsenical sulfuric acid and obtaining arsenic therefrom, consisting in reducing the arsenic compounds in the arsenical sulfuric acid to the arsenious state and then treating the acid at a temperature from 90° C. to a point just below the boiling point of arsenious chlorid with hydrochloric acid gas in a manner substantially as described and allowing the liquid arsenious chlorid formed to separate from the sulfuric acid, and treating the liquid arsenious chlorid with a limited quantity of water, and treating the sulfuric acid with air and passing the gases into a water scrubber and adding to the arsenious oxid so separated liquid arsenious chlorid, the solution thus formed being treated with a limited quantity of water, then filtering the solution to separate selenium and adding, to the solution filtered off a further quantity of water, and filtering so as to separate arsenious oxid.

7. The process of purifying arsenical sulfuric acid and obtaining arsenic therefrom, by treating the arsenical sulfuric acid at a temperature from 90° C. to a point just below the boiling point of arsenious chlorid with hydrochloric acid gas in a manner substantially as described and treating the liquid arsenious chlorid so produced with a limited quantity of water, and treating the sulfuric acid with air and passing the gases into a water scrubber and adding to the arsenious oxid, so separated, liquid arsenious chlorid, the solution thus formed being treated with a limited quantity of water, then filtering the solution so as to separate selenium, and adding to the solution filtered off, a further quantity of water, and filtering so as to separate arsenious oxid, and returning the hydrochloric acid so as to liberate the hydrochloric acid gas by means of sulfuric acid, then re-utilizing the liberated gas in the production of liquid arsenious chlorid from further quantities of arsenical sulfuric acid.

8. The process of purifying arsenical sulfuric acid and obtaining arsenic therefrom, consisting in reducing the arsenic compound in the arsenical sulfuric acid to the arsenious state and then treating the acid at a temperature from 90° C. to a point just below the boiling point of arsenious chlorid with hydrochloric acid gas in a manner substantially as described and treating the liquid arsenious chlorid so produced with a limited quantity of water, and treating the sulfuric acid with air and passing the gases into a water-scrubber and adding to the arsenious oxid, so separated, liquid arsenious chlorid, the solution thus formed being treated with a limited quantity of water, then filtering the solution so as to separate selenium, and adding to the solution filtered off, a further quantity of water, and filtering so as to separate arsenious oxid, and returning the hydrochloric acid so as to liberate the hydrochloric acid gas by means of sulfuric acid, and then re-utilizing the liberated gas in the production of liquid arsenious chlorid from further quantities of arsenical sulfuric acid.

9. The process of purifying arsenical sulfuric acid and obtaining arsenic therefrom, by treating the arsenical sulfuric acid at a temperature from 90° C. to a point just below the boiling point of arsenious chlorid, with hydrochloric acid gas in a manner substantially as described, and allowing the liquid arsenious chlorid formed to separate from the sulfuric acid, and treating the liquid arsenious chlorid with a limited quantity of water, and treating the sulfuric acid with air, and passing the gases into a water-scrubber and adding to the arsenious oxid so separated, liquid arsenious chlorid, the solution thus formed being treated with a limited quantity of water, then filtering the solution to separate the selenium and adding to the solution filtered off a further quantity of water, and filtering so as to separate arsenious oxid and returning the hydrochloric acid so as to liberate the hydrochloric acid gas by means of sulfuric acid, and then utilizing the gas so liberated in the production of liquid arsenious chlorid from further quantities of arsenical sulfuric acid and returning the arsenious oxid which was dissolved in the hydrochloric acid to the process for recovery.

10. The process of purifying arsenical sulfuric acid and obtaining arsenic therefrom consisting in reducing the arsenic compounds in the arsenical sulfuric acid to the arsenious state, then treating the acid at a temperature from 90° C. to a point just below the boiling point of arsenious chlorid with hydrochloric gas in a manner substantially as described and allowing the liquid arsenious chlorid formed to separate from the sulfuric acid and treating the liquid arsenious chlorid with a limited quantity of water and treating the sulfuric acid with air and passing the gases into a water scrubber and adding to the arsenious oxid, so separated, liquid arsenious chlorid, the solution thus formed being treated with a limited quantity of water then filtering the solution to separate the selenium, and adding to the solution filtered off, a further quantity of water, and filtering so as to separate arsenious oxid, and returning the hydrochloric acid gas by means of sulfuric acid and then utilizing the liberated gas in the production of liquid arsenious chlorid from further quantities of arsenical sulfuric acid, and returning the arsenious oxid which was dissolved in the hydrochloric acid to the process for recovery.

In testimony whereof we have signed this specification in the presence of two subscribing witnesses.

JULIUS RASCHEN.
ARTHUR EDWARD WAREING.
JEFF HENRY SHORES.

Witnesses:
G. CHRISTOPHER CLAYTON,
JAMES HARPER.